United States Patent
Anezaki et al.

(10) Patent No.: US 9,686,431 B2
(45) Date of Patent: Jun. 20, 2017

(54) USING HYPER-TEXT TRANSFER PROTOCOL TUNNELING TO TRANSITION A COMPUTER FROM A LOW POWER MODE TO A NORMAL POWER MODE

(71) Applicant: Konica Minolta, Inc., Chiyoda-ku, Tokyo (JP)

(72) Inventors: Kazuya Anezaki, Itami (JP); Hirokazu Kubota, Otsu (JP); Kenji Matsuhara, Kawanishi (JP); Satoshi Masuda, Neyagawa (JP); Yuki Asai, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/947,528

(22) Filed: Nov. 20, 2015

(65) Prior Publication Data
US 2016/0150112 A1     May 26, 2016

(30) Foreign Application Priority Data

Nov. 21, 2014    (JP) ................................. 2014-237173

(51) Int. Cl.
*H04N 1/00*          (2006.01)
*H04L 12/46*        (2006.01)
(Continued)

(52) U.S. Cl.
CPC ....... *H04N 1/00891* (2013.01); *G06F 3/1236* (2013.01); *G06F 3/1287* (2013.01);
(Continued)

(58) Field of Classification Search
CPC ........ G06F 1/32; G06F 3/1221; G06F 3/1236; G06F 3/1287; H04N 1/00891;
(Continued)

(56) References Cited

U.S. PATENT DOCUMENTS

2003/0009571 A1*    1/2003    Bavadekar .......... H04L 12/4633
                                                                        709/230

FOREIGN PATENT DOCUMENTS

| JP | 2005523489 A | 8/2005 |
|----|--------------|--------|
| JP | 2007087293 A | 4/2007 |
| JP | 2011164927 A | 8/2011 |

OTHER PUBLICATIONS

Japanese Notification of Reasons for Refusal corresponding to Application No. 2014-237173; Date of Mailing: Jan. 10, 2017, with English translation.

* cited by examiner

*Primary Examiner* — Eric A Rust
(74) *Attorney, Agent, or Firm* — Cantor Colburn LLP

(57) ABSTRACT

A communication system includes a cloud server, a management server, a gateway-enabled device, and a printing apparatus, and these are connected to each other. The gateway-enabled device includes a mode switch that wakes up the device from power saving mode when a HTTP tunneling request is received from the cloud server via a second requesting portion of the management server, a tunneling portion that accesses the cloud server by HTTP tunneling if the request is received via a first requesting portion of the management server during normal operation mode or that does the same after back to normal operation mode if the request is received via the second requesting portion by a method allowing waking up from power saving mode, a receiver that receives a print job from the cloud server having being accessed by HTTP tunneling, and a transfer portion that transfers the print job to the printing apparatus.

10 Claims, 15 Drawing Sheets

(51) Int. Cl.
*H04L 29/08* (2006.01)
*G06F 3/12* (2006.01)

(52) U.S. Cl.
CPC .......... *H04L 12/4633* (2013.01); *H04L 67/02* (2013.01); *H04L 67/10* (2013.01); *H04N 1/00209* (2013.01); *H04N 1/00244* (2013.01); *H04N 2201/0094* (2013.01); *Y02B 60/46* (2013.01)

(58) Field of Classification Search
CPC .......... H04N 1/00209; H04N 1/00244; H04N 1/00896; H04L 12/4633; H04L 67/10; H04L 67/02
USPC ................................................ 358/1.14, 1.15
See application file for complete search history.

```
Return-Path:<xxxxx@testtest.com>
 X-Original-To:00000@sample.jp
 Delivered-To:11111@sample.jp
            ·
            ·
            ·
Content-Transfer-Encoding:7bit
X-Mailer:Microsoft Outlook Express 6.00.2900.2527
KM_CLOUD:HTTP Tunnel Connect Request
```

FIG.11

USING HYPER-TEXT TRANSFER PROTOCOL TUNNELING TO TRANSITION A COMPUTER FROM A LOW POWER MODE TO A NORMAL POWER MODE

This application claims priority under 35 U.S.C. §119 to Japanese Patent Application No. 2014-237173 filed on Nov. 21, 2014, the entire disclosure of which is incorporated herein by reference in its entirety.

BACKGROUND OF THE INVENTION

Field of the Invention

The present invention relates to a communication system having a cloud server that accepts print jobs input from external apparatuses such as personal computers and tablet computer terminals, a management server that transfers to a gateway-enabled device a request to access the cloud server by HTTP tunneling, which is received from the cloud server, a gateway-enabled device that accesses the cloud server by HTTP tunneling in accordance with the request received from the management server and that receives print jobs from the cloud server; and a printing apparatus that executes the print jobs received from the gateway-enabled device. The present invention also relates to a communication method.

Description of the Related Art

The following description sets forth the inventor's knowledge of related art and problems therein and should not be construed as an admission of knowledge in the prior art.

Server software has conventionally been installed on servers connected to a local area network (LAN); now, cloud applications are widely installed on cloud servers, as referred to as cloud services, for the purpose of saving purchase, installation, and management costs on servers. There is a cloud application that accesses a printing apparatus connected to a company's LAN to provide a cloud service, but such an access is often blocked by a firewall because it is an access to an intranet from the Internet. The printing apparatus may have its own private IP address, serving for nothing because the cloud application is not capable of specifying the printing apparatus by IP address.

To solve this problem, a gateway-enabled device can be suggested. The gateway-enabled device creates a hyper-text transfer protocol (HTTP) tunnel to allow target data to go to the cloud server through the tunnel.

FIG. 14 illustrates a basic configuration of a communication system having a gateway-enabled device. The communication system is provided with a gateway-enabled device 1100, a printing apparatus (will be also referred to as MFP) 1200, a management server 1300, and a cloud server 1400. These elements can access each other through the Internet. The gateway-enabled device 1100 and the printing apparatus 1200 are connected to each other through a communication network in an intranet.

In this embodiment, a multi-function peripheral (MFP), i.e., a digital image processing apparatus having various functions such as copier function, printer function, scanner function, and facsimile function, is employed as the printing apparatus 1200. Furthermore, a MFP as described above, but having power saving modes such as sleep mode, is employed as the gateway-enabled device 1100.

The gateway-enabled device 1100, at start-up, establishes an extensible messaging and presence protocol (XMPP) message session to the management server 1300 (see (a) in FIG. 14). At the same time, the gateway-enabled device 1100 transmits to the management server 1300 identification information of the printing apparatus 1200 that allows access from the gateway-enabled device 1100. When the user selects the printing apparatus 1200 and gives a print instruction, a cloud application installed on the cloud server 1400 transmits to the management server 1300 a request to access the cloud server 1400 by HTTP tunneling to start communication with the printing apparatus 2100 (see (b) in FIG. 14). Using a message session, the management server 1300 transfers the HTTP tunneling request to the gateway-enabled device 1100 (see (c) in FIG. 14).

Upon receiving this request, the gateway-enabled device 1100 establishes a HTTP session by accessing the cloud server 400 by HTTP tunneling (see (d) in FIG. 14). Using this HTTP session, the gateway-enabled device 1100 receives data from the cloud server 1400. The gateway-enabled device 1100 converts it to a predetermined protocol to transfer to the MFP 1200. Receiving data from the MFP 1200, the gateway-enabled device 1100 converts it to HTTP to transfer to the cloud server 1400 (see (e) in FIG. 14). All these operations are caused by a function called "gateway". FIG. 15 illustrates the mechanisms of the cloud server 1400, the gateway-enabled device 1100, and the MFP 1200 when communication through HTTP tunnel is performed.

HTTP tunneling is a method for delivering packets described in various protocols by encapsulating them with another protocol. In the example of FIG. 15, a packet has a header for controlling communication through HTTP tunnel and print data in its body, as well as a protocol standard header. The cloud server 1400 transmits such a packet to the gateway-enabled device 1100. The gateway-enabled device 1100 obtains the print data by analyzing the protocol of the received packet and transfers it to the printing apparatus 1200.

Here, in this example, it should be noted that gateway function is software installed on devices such as MFPs.

In order to save energy, MFPs and other devices of recent years are configured to cut off the power to their own modules when the MFPs and other devices are not in use. Specifically, they have a specific power saving mode ("deep sleep mode", for example) for cutting off the power to their main controllers. Furthermore, for example, an external apparatus may access the device to use, by transmitting a unicast packet. In this case, with an inbound packet, the device returns to normal operation mode from deep sleep mode to resume the power to the main controller and relevant modules such as a print module.

The gateway-enabled device 1100 needs to maintain a XMPP session while gateway function is active. To enter deep sleep mode, the gateway-enabled device 110 needs to cut off the power to the main controller or terminate a XMPP session. In other words, the gateway-enabled device 1100 needs to stay in normal operation mode while it is in communication with the cloud server 1400; the gateway-enabled device 1100 can enter deep sleep mode while it is not in communication with the cloud server 1400.

This causes the need for a means allowing the gateway-enabled device 1100 to stay in communication with the cloud server 1400 even while the gateway-enabled device 1100 is in deep sleep mode.

For example, Japanese Unexamined Patent Publication No. 2007-087293 discloses a technique that wakes up a printing apparatus, to which an e-mail is addressed, from deep sleep mode with a magic packet.

The cloud server 1400 and the management server 1300 can hardly be successful in transmitting a magic packet because a firewall blocks inbound data from the cloud.

In contrast, firewalls do not block other types of inbound data, such as facsimiles and e-mails. With such a type of inbound data, the gateway-enabled device 1100 can wake up from deep sleep mode to normal operation mode, but later needs to establish a XMPP session again.

Furthermore, it takes extra time to establish a XMPP session because the gateway-enabled device 1100 needs to negotiate with and be authenticated by the management server 1300 all over again, and the management server 1300 suffers from excessive load by conducting negotiation and authentication very frequently. These are unsolved problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a communication system including a cloud server, a management server, a gateway-enabled device, and a printing apparatus, the cloud server, the management server, and the gateway-enabled device being connected to each other through the Internet, the printing apparatus being connected to the gateway-enabled device through a communication network, the cloud server including:
a print job accepting portion that accepts a print job input from an external apparatus, the print job including a notice of the printing apparatus;
an access requesting portion that transmits a HTTP tunneling request to the management server, the HTTP tunneling request to access the cloud server by HTTP tunneling, the HTTP tunneling request being addressed to the gateway-enabled device; and
a print job transmitter that transmits the print job to the gateway-enabled device, the print job being accepted by the print job accepting portion, the gateway-enabled device having accessed the cloud server by HTTP tunneling in accordance with the HTTP tunneling request, the HTTP tunneling request being received from the access requesting portion by way of the management server, the management server including:
a first access requesting portion that transfers the HTTP tunneling request to the gateway-enabled device based on the HTTP tunneling request received from the cloud server; and
a second access requesting portion that transfers the HTTP tunneling request to the gateway-enabled device by a method allowing the gateway-enabled device to wake up from power saving mode to normal operation mode, if the HTTP tunneling request is received from the cloud server while the gateway-enabled device is in power saving mode, the gateway-enabled device including:
a mode switch that switches the gateway-enabled device from normal operation mode to power saving mode and that wakes up the gateway-enabled device from power saving mode to normal operation mode based on the HTTP tunneling request received from the second access requesting portion of the management server;
a tunneling portion that accesses the cloud server by HTTP tunneling if the HTTP tunneling request is received from the first access requesting portion of the management server while the gateway-enabled device is in normal operation mode, or that accesses the cloud server by HTTP tunneling after the mode switch returns the gateway-enabled device to normal operation mode, if the HTTP tunneling request is received from the second access requesting portion of the management server while the gateway-enabled device is in power saving mode;
a receiver that receives the print job from the cloud server having been accessed by the tunneling portion by HTTP tunneling; and
a print job transfer portion that transfers the print job to the printing apparatus specified in the print job, the print job being received by the receiver, wherein the printing apparatus is provided with a job executor that executes the print job, the print job being received from the gateway-enabled device.

A second aspect of the present invention relates to a communication method for a communication system, the communication system including a cloud server, a management server, a gateway-enabled device, and a printing apparatus, the cloud server, the management server, and the gateway-enabled device being connected to each other through the Internet, the printing apparatus being connected to the gateway-enabled device through a communication network, the communication method including:

the following steps of the cloud server:
accepting a print job input from an external apparatus, the print job including a notice of the printing apparatus, the external apparatus logged on the cloud server;
transmitting a HTTP tunneling request to the management server, the HTTP tunneling request to access the cloud server by HTTP tunneling, the HTTP tunneling request being addressed to the gateway-enabled device; and
transmitting the print job to the gateway-enabled device, the print job being accepted by the print job accepting portion, the gateway-enabled device having accessed the cloud server by HTTP tunneling in accordance with the HTTP tunneling request, the HTTP tunneling request being received from the cloud server by way of the management server, the following steps of the management server:
allowing a first access requesting portion to transfer the HTTP tunneling request to the gateway-enabled device based on the HTTP tunneling request received from the cloud server; and
allowing the first access requesting portion to transfer the HTTP tunneling request to the gateway-enabled device by a method allowing the gateway-enabled device to wake up from power saving mode to normal operation mode, if the HTTP tunneling request is received from the cloud server while the gateway-enabled device is in power saving mode, and the following steps of the gateway-enabled device:
switching the gateway-enabled device from normal operation mode to power saving mode, and waking up the gateway-enabled device from power saving mode to normal operation mode based on the HTTP tunneling request received from the second access requesting portion of the management server;
accessing the cloud server by HTTP tunneling if the HTTP tunneling request is received from the first access requesting portion of the management server while the gateway-enabled device is in normal operation mode, or accessing the cloud server by HTTP tunneling after the mode switch returns the gateway-enabled device to normal operation mode, if the HTTP tunneling request is received from the second access requesting portion of the management server while the gateway-enabled device is in power saving mode;

receiving the print job from the cloud server having been accessed by HTTP tunneling; and transferring the print job to the printing apparatus specified in the print job, the print job being received from the cloud server, wherein the printing apparatus is provided with a job executor whose step is executing the print job, the print job being received from the gateway-enabled device.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 11 shows a substantial part of the header of an e-mail transferred to the gateway-enabled device from a mail server;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
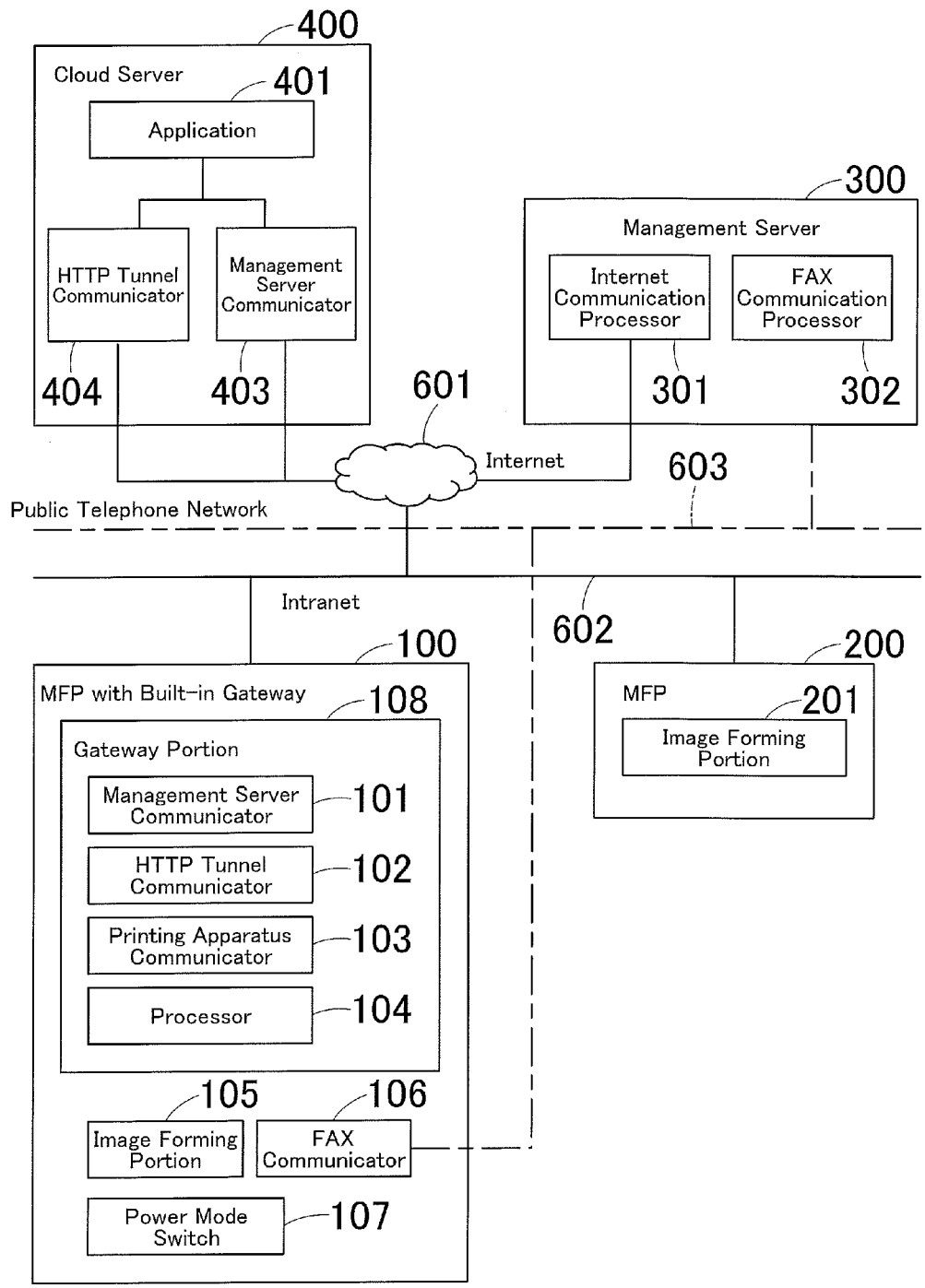
FIG. 1 is a view illustrating a comprehensive configuration of a communication system according to one embodiment of the present invention.

FIG. 1 is a view illustrating a comprehensive configuration of a communication system according to one embodiment of the present invention. The communication system is provided with a gateway-enabled device 100, a printing apparatus 200, a management server 300, and a cloud server 400, and these elements can access each other through the Internet. The gateway-enabled device 100 and the printing apparatus 200 are connected to each other through a common communication network 602 in an intranet.

In this embodiment, a MFP, i.e., a multifunctional digital image processing apparatus having various functions such as copier function, printer function, and scanner function, is employed as the gateway-enabled device 100. Hereinafter, gateway-enabled devices will also be referred to as "MFPs with build-in gateway". It should be understood that gateway-enabled devices are not limited to MFPs; gateway-enabled devices may be any other devices as long as they have gateway function and power saving mode such as deep sleep mode.

The device with build-in gateway 100 is provided with a gateway portion 108 that implements gateway function, an image forming portion 105, a facsimile (FAX) communicator 106, and a power mode switch 107.

The gateway portion 108 is provided with a management server communicator 101, a HTTP tunnel communicator 102, a printing apparatus communicator 103, and a processor 104.

The management server communicator 101 is an interface that controls communications with the management server 300. The HTTP tunnel communicator 102 accesses the cloud server 400 by HTTP tunneling in accordance with a request transferred from the management server 300; through HTTP tunnel, the HTTP tunnel communicator 102 transmits and receives print jobs and other data to and from the cloud server 400. The printing apparatus communicator 103 controls communications with the printing apparatus 200. The processor 104 performs processing on data received and to be transmitted via these communicators and other data.

The image forming portion 105 prints, on sheets of paper, image data obtained from a document by a scanner not shown in the figure and print data received from external apparatuses.

The FAX communicator 106, which supports the G3 standard, performs facsimile communication with the management server 300 and other external apparatuses through a public telephone network 603.

The power mode switch 107 switches the MFP with build-in gateway 100 to power saving mode such as deep sleep mode at a predetermined timing, for example, when the MFP with built-in gateway 100 is not in use, by cutting off the power to the main controller and relevant modules. The power mode switch 107 also switches the same from power saving mode to normal operation mode.

The MFP with build-in gateway 100 is further provided with a CPU as a main controller, a ROM, a RAM, a hard disk drive, and other elements, which is not illustrated in the figure for simplicity. The CPU controls the MFP with build-in gateway 100 in a unified and systematic manner by executing operation programs stored on a recording medium such as the ROM or the hard disk drive.

A gateway-disabled MFP is employed as the printing apparatus 200. The printing apparatus 200 is provided with an image forming portion 201. The image forming portion 201 executes a print job that is received from the cloud server 400 by way of the MFP with build-in gateway 100. Hereinafter, printing apparatuses will also be referred to as "MFPs".

The management server 300, which is comprised of a personal computer, is provided with an internet communication processor 301 and a FAX communication processor 302.

The internet communication processor 301 controls communications with the cloud server 400 and the MFP with built-in gateway 100, which are connected to the management server 300 through the Internet, and performs processing on data received and to be transmitted through the Internet. The FAX communication processor 302 performs facsimile communication with the MFP with build-in gateway 100 through the G3 type network.

The cloud server 400, which is comprised of a personal computer, for example, is provided with an application 400, a HTTP tunnel communicator 404, and a management server communicator 403.

The application 401 accepts a print job created by a user logged on the cloud server 400 from an external apparatus such as a personal computer. The print job includes a printing apparatus specified by the log-on user. Upon accepting the print job, the application 401 transmits to the management server 300 a request for the MFP with built-in gateway 100 to access the cloud server 400, by way of the management server communicator 403. When the MFP with built-in gateway 100 successfully accesses the cloud server 400 by HTTP tunneling, the application 401 transfers the print job to the MFP with built-in gateway 100 through HTTP tunnel by way of the HTTP tunnel communicator 404.

Hereinafter, the operation of the communication system of FIG. 1 will be described briefly.

A user creates a print job for the MFP 200 the user's terminal apparatus such as a personal computer or a tablet computer terminal. The cloud server 400 accepts the print job and transmits to the management server 300 a request for the MFP with built-in gateway to access the cloud server 400 by HTTP tunneling.

While the MFP with built-in gateway 100 is in normal operation mode, not in power saving mode, the MFP with built-in gateway 100 maintains a XMPP session to the management server 300. Using the XMPP session, the management server 300 transfers the HTTP tunneling request to the MFP with built-in gateway 100.

Upon receiving this request, the MFP with built-in gateway 100 accesses the cloud server 400 by HTTP tunneling. Through HTTP tunnel, the cloud server 400 transfers data of a print job to the MFP with built-in gateway 100. The MFP with built-in gateway 100 converts the data into a predetermined protocol and transfers it to the MFP 200. The MFP 200 then executes the print job with the received data.

Figure 2:
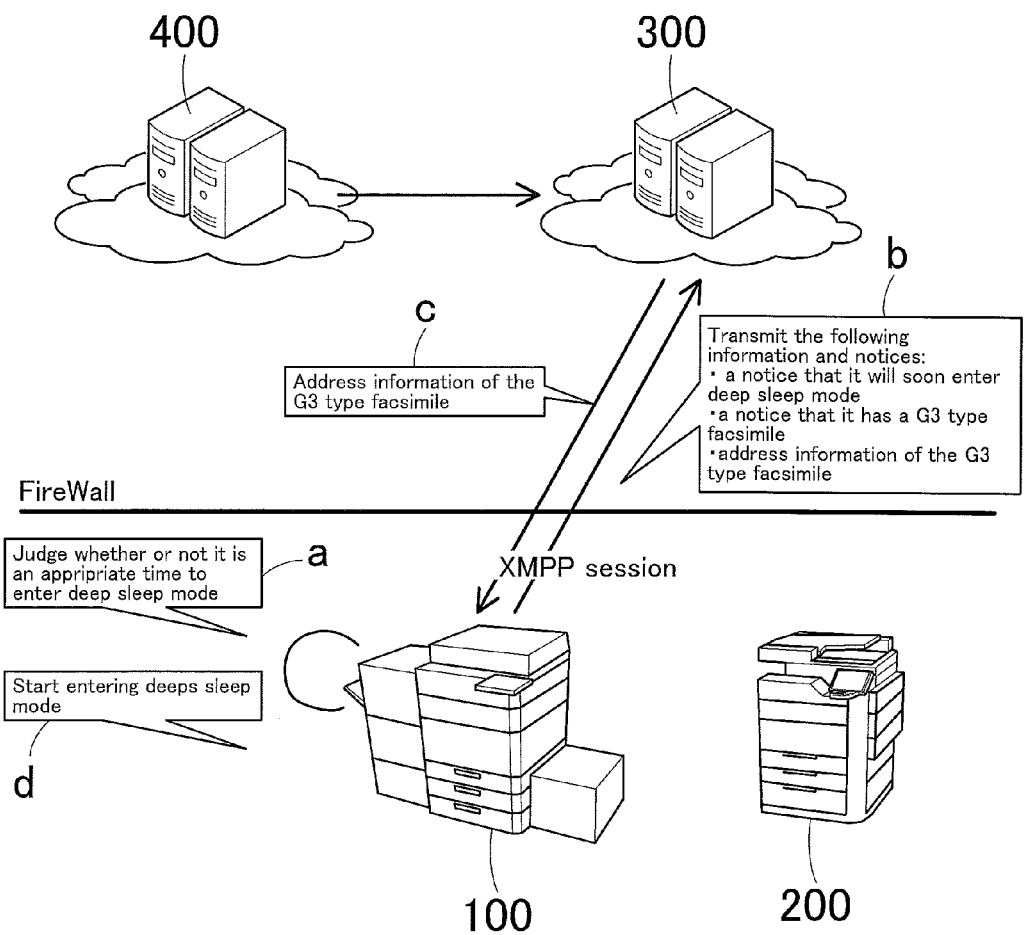
FIG. 2 is a view to explain the operations to be performed when a gateway-enabled device enters deep sleep mode.

FIG. 2 is a view to explain the operations to be performed when the MFP with built-in gateway 100 enters power saving mode (deep sleep mode).

It is judged whether or not a predetermined period of time has elapsed since the last time the MFP with built-in gateway 100 was used. In other words, it is judged whether or not it is an appropriate time to enter deep sleep mode (see (a) in FIG. 2). If it is an appropriate time to enter deep sleep mode, the MFP with built-in gateway 100 enters deep sleep mode. In the transition to deep sleep mode, the MFP with built-in gateway 100 transmits the following information and notices to the management server 300, using a XMPP or another session. They are identification information of the MFP 100 itself, a notice that it will soon enter deep sleep mode, a notice that it has a G3 type facsimile, and address information of the G3 type facsimile (facsimile number) (see (b) in FIG. 2). In response to all the information and notices, the management server 300 returns address information of its own G3 type facsimile (facsimile number) to the MFP with built-in gateway 100 (see (c) in FIG. 2). Upon receiving the address information, the MFP with built-in gateway 100 starts entering deep sleep mode (see (d) in FIG. 2).

Figure 3:
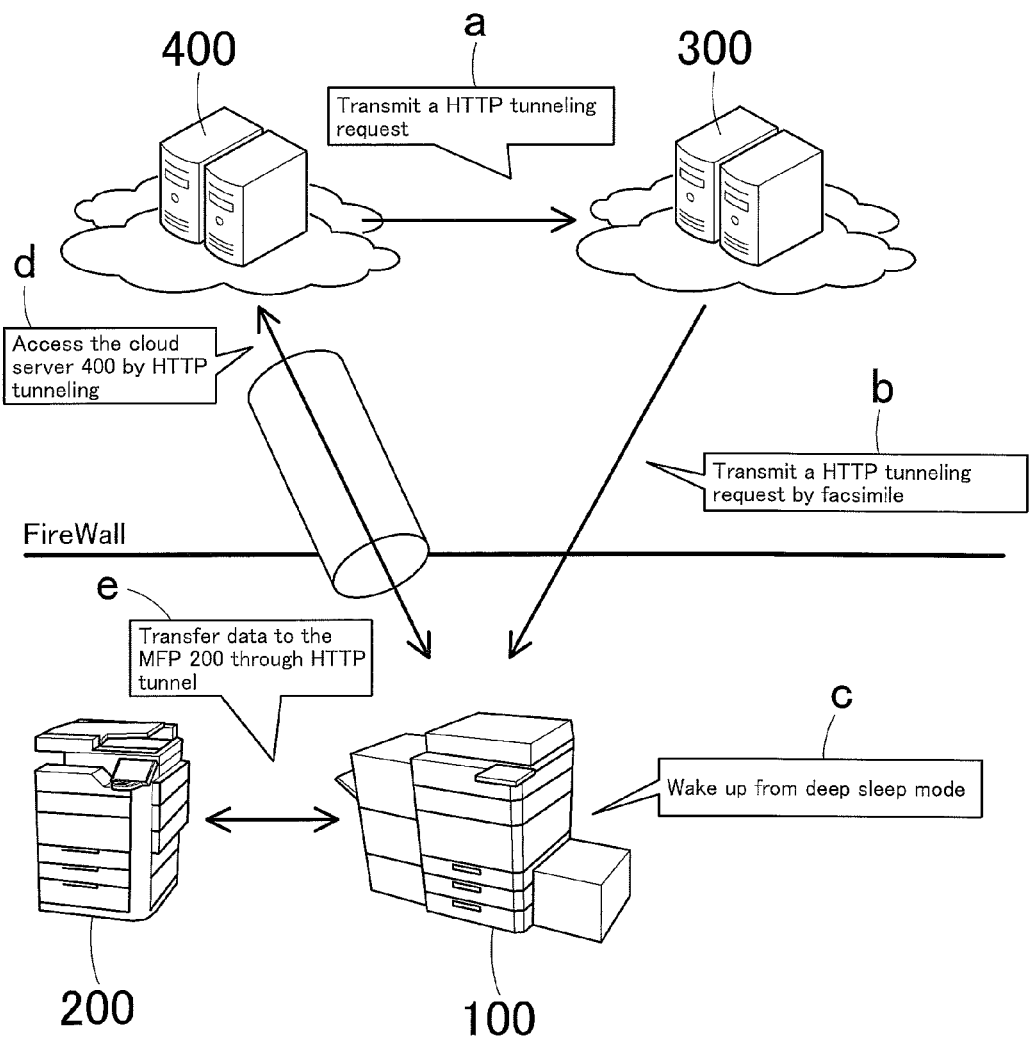
FIG. 3 is a view to explain the operations to be performed when a cloud server accepts a print job while the gateway-enabled device is in deep sleep mode.

FIG. 3 is a view to explain the operations to be performed when the cloud server 400 accepts a print job while the MFP with built-in gateway 100 is in deep sleep mode.

Upon accepting a print job, the cloud server 400 transmits to the management server 300 a request for the MFP with built-in gateway 100 to access the cloud server 400 (see (a) in FIG. 3).

The management server 300 already received a notice from the MFP with built-in gateway 100 and so recognizes that the MFP with built-in gateway 100 is now in deep sleep mode. So, the management server 300 transmits to the MFP with built-in gateway 100 a request to access the cloud server 400 by HTTP tunneling, by its own G3 type facsimile that uses the public telephone network 603 (see (b) in FIG. 3).

With the inbound data by the G3 type facsimile, the MFP with built-in gateway 100 wakes up from deep sleep mode (see (c) in FIG. 3). The MFP with built-in gateway 100 then examines the sender address of the inbound facsimile. If it is identical with the address information of the G3 type facsimile of the management server 300, which is received from the management server 300 before the MFP with built-in gateway 100 enters deep sleep mode, the MFP with built-in gateway 100 recognizes that the inbound facsimile is intended as a request to access the cloud server 400 by HTTP tunneling.

Upon receiving this request, the MFP with built-in gateway 100 accesses the cloud server 400 by HTTP tunneling (see (d) in FIG. 3). Through HTTP tunnel, the cloud server 400 transfers data of a print job to the MFP 200 by way of the MFP with built-in gateway 100 (see (e) in FIG. 3). The MFP 200 then executes the print job with the received data.

Figure 4:
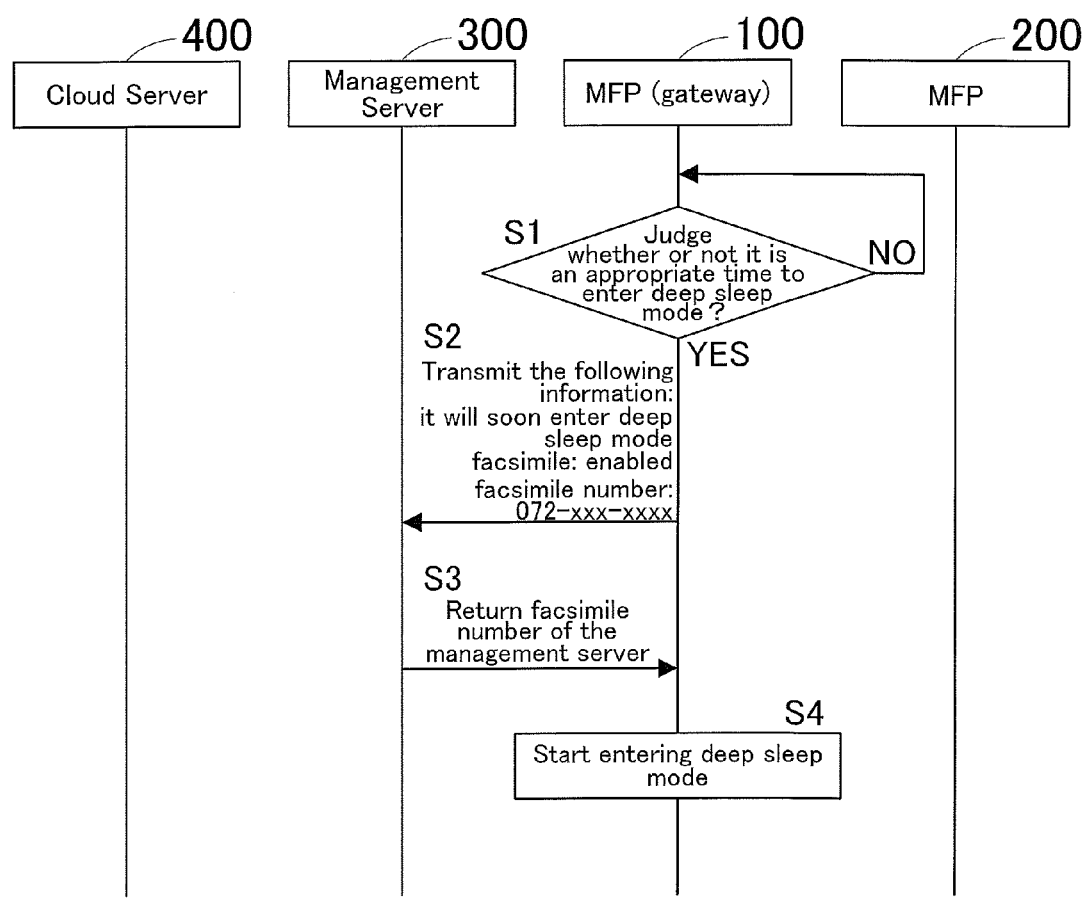
FIG. 4 is a sequence representing the control operations of the apparatuses to be performed when the gateway-enabled device enters deep sleep mode.

FIG. 4 is a sequence representing the control operations of the apparatuses to be performed when the MFP with built-in gateway 100 enters deep sleep mode.

In Step S1, the MFP with built-in gateway 100 judges whether or not it is an appropriate time to enter deep sleep mode. The judgment is made, for example, depending on whether or not a predetermined period of time has elapsed since the last time the MFP with built-in gateway 100 was used. If a predetermined period of time has elapsed, it is an appropriate time to enter deep sleep mode. If it is not an appropriate time to enter deep sleep mode (NO in Step S1), the sequence keeps staying at Step S1. If it is an appropriate time to enter deep sleep mode (YES in Step S1), the sequence proceeds to Step S2, in which the MFP with built-in gateway 100 transmits to the management server 300 identification information of the MFP 100 itself, a notice that it will soon enter deep sleep mode, a notice that it has a G3 type facsimile, and address information of the G3 type facsimile (facsimile number). The MFP with built-in gateway 100 may transmit the information and notices to the management server 300 using a XMPP session or using another session such as a simple object access protocol (SOAP) session or an extensible markup language (XML) session.

In Step S3, in response to all the information and notices, the management server 300 returns address information of its own G3 type facsimile (facsimile number) to the MFP with built-in gateway 100.

After that, in Step S4, the MFP with built-in gateway 100 enters deep sleep mode by terminating the active session or cutting off the power to the main controller and relevant modules, for example.

Figure 5:
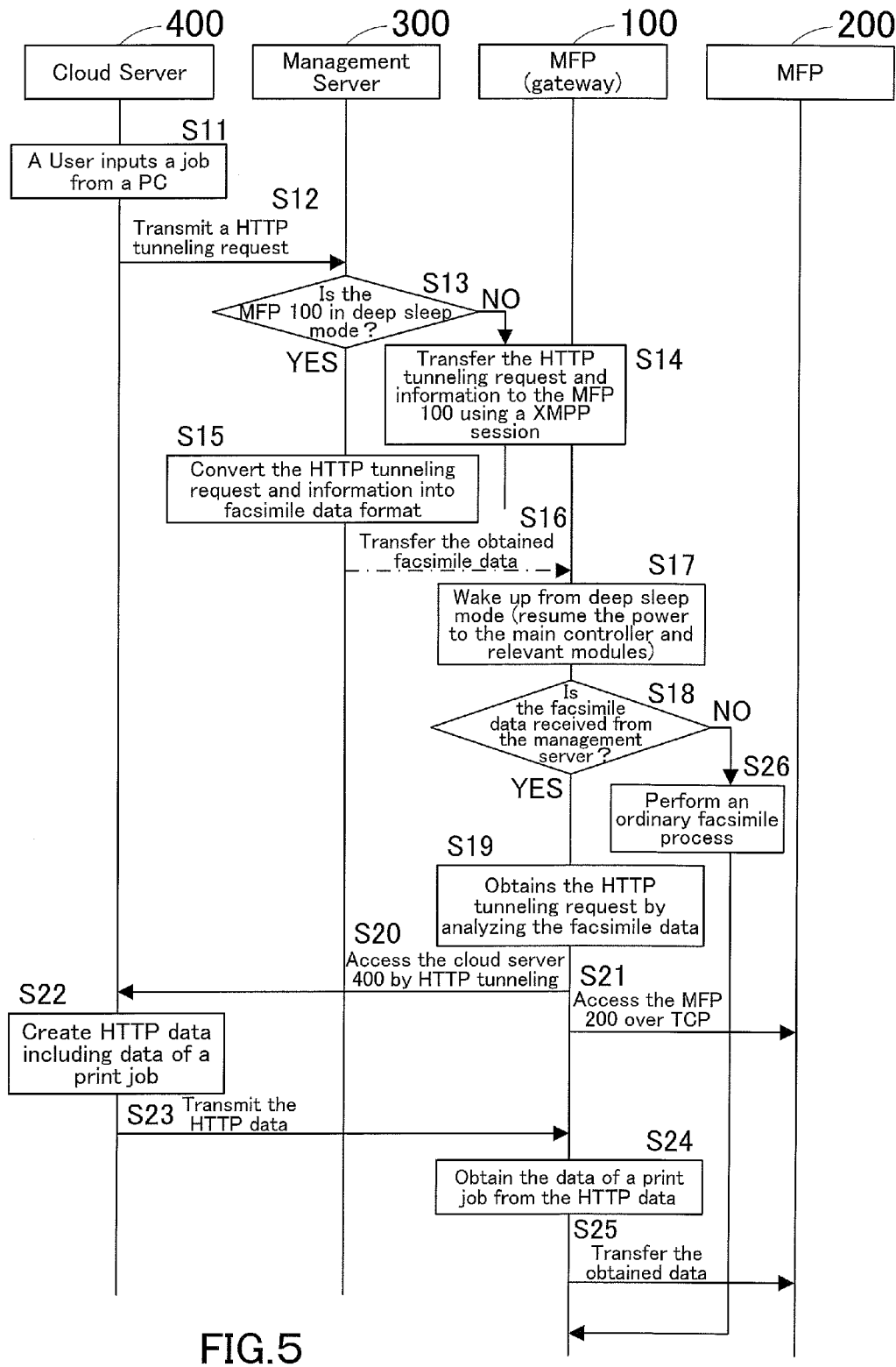
FIG. 5 is a sequence representing the control operations of the apparatuses to be performed when the cloud server accepts a print job while the gateway-enabled device is in deep sleep mode.

FIG. 5 is a sequence representing the control operations of the apparatuses to be performed when the cloud server 400 accepts a print job while the MFP with built-in gateway 100 is in deep sleep mode.

A user accesses the application 401 of the cloud server 400 by operating a personal computer (PC) or a portable terminal apparatus, for example. In Step S11, the user creates a print job for printing specified data by a specified printing apparatus and inputs it to the cloud server 400. The cloud server 400 then generates a request to access the cloud server 400 by HTTP tunneling. In Step S12, the cloud server 400 transmits the request to the management server 300.

The management server 300 judges, in Step S13, whether or not the MFP with built-in gateway 100 is in deep sleep mode. This judgement is made depending on whether or not such a notice has been received from the MFP with built-in gateway 100.

If the MFP with built-in gateway 100 is not in deep sleep mode (NO in Step S13), the sequence proceeds to Step S14, in which the management server 300 transfers the HTTP tunneling request and information to the MFP with built-in gateway 100 using a XMPP session, as in the conventional system. In Step S19, the MFP with built-in gateway 100 analyzes the HTTP tunneling request. The sequence then proceeds forward (continues from Step S20 in order) as in the case where the MFP with built-in gateway 100 is in normal operation mode in the conventional system.

If the MFP with built-in gateway 100 is in deep sleep mode (YES in Step S13), the management server 300 confirms the presence of a notice that it has a G3 type facsimile and address information of the G3 type facsimile. In Step S15, the management server 300 converts the HTTP tunneling request and information into facsimile data format; in Step S16, the management server 300 transmits, by the G3 type facsimile, the obtained facsimile data to the address received from the MFP with built-in gateway 100. The HTTP tunneling request and information includes a URL to access over HTTP, identification information of the cloud server 400 to access, and identification information of a tunnel.

With the inbound facsimile data, the MFP with built-in gateway 100 wakes up from deep sleep mode in Step S17. In other words, the MFP with built-in gateway 100 resumes the power to the main controller and relevant modules. In Step S18, the MFP with built-in gateway 100 judges whether or not the facsimile data is received from the management server 300.

If it is not received from the management server 300 (NO in Step S18), the MFP with built-in gateway 100 performs an ordinary facsimile process in Step S26. If it is received from the management server 300 (YES in Step S18), the MFP with built-in gateway 100 obtains the HTTP tunneling request and information by analyzing the facsimile data, in Step S19. The MFP with built-in gateway 100 accesses the cloud server 400 by HTTP tunneling in Step S20, then accesses the MFP 200 over TCP in Step S21.

In Step S22, upon opening of a HTTP tunnel, the cloud server 400 creates HTTP data including data of a print job. In Step S23, the cloud server 400 transmits the HTTP data to the MFP with built-in gateway 100.

In Step S24, the MFP with built-in gateway 100 obtains data of a print job from the HTTP data received therefrom. In Step S25, the MFP with built-in gateway 100 transfers the data to the MFP 200. The MFP 200 executes the print job with the received data. If necessary, the MFP 200 may return a notice of printing completion to the cloud server 400 by way of the MFP with built-in gateway 100.

As described above, in this embodiment, while the MFP with built-in gateway 100 is in deep sleep mode, the management server 300 receives a request to access the cloud server 400 by HTTP tunneling from the cloud server 400. The management server 300 accesses the MFP with built-in gateway 100 by a G3 type facsimile that allows the MFP 100 to wake up from power saving mode to normal operation mode. The management server 300 then transfers the HTTP tunneling request to the MFP with built-in gateway 100 by the G3 type facsimile. With the inbound facsimile data, the MFP with built-in gateway 100 wakes up from deep sleep mode to normal operation mode to access the cloud server 400 by HTTP tunneling. Through HTTP tunnel, the MFP with built-in gateway 100 accepts a print job from the cloud server 400. The MFP with built-in gateway 100 transfers the print job to the MFP 200 that is specified by the print job. The MFP 200 then executes the received print job.

Upon receiving a HTTP tunneling request by way of the management server 300, the MFP with built-in gateway 100 accesses the cloud server 400 by HTTP tunneling while it is in normal operation mode, as a matter course, and even while it is in deep sleep mode. This allows the MFP 200 to receive and execute a print job.

More specifically, upon receiving a HTTP tunneling request by way of the management server 300, the MFP with built-in gateway 100 wakes up from power saving mode to access the cloud server 400 by HTTP tunneling, and later does not need to establish a XMPP session to the management server 300 again. Furthermore, there is no need to take extra time to negotiate with and be authenticated by the management server 300; without conducting negotiation and authentication very frequently, the management server 300 does not suffer from excessive load anymore.

Briefly, the MFP with built-in gateway 100 can wake up from power saving mode to access the cloud server 400 without adversely affecting the load on the management server 300.

Figure 6:
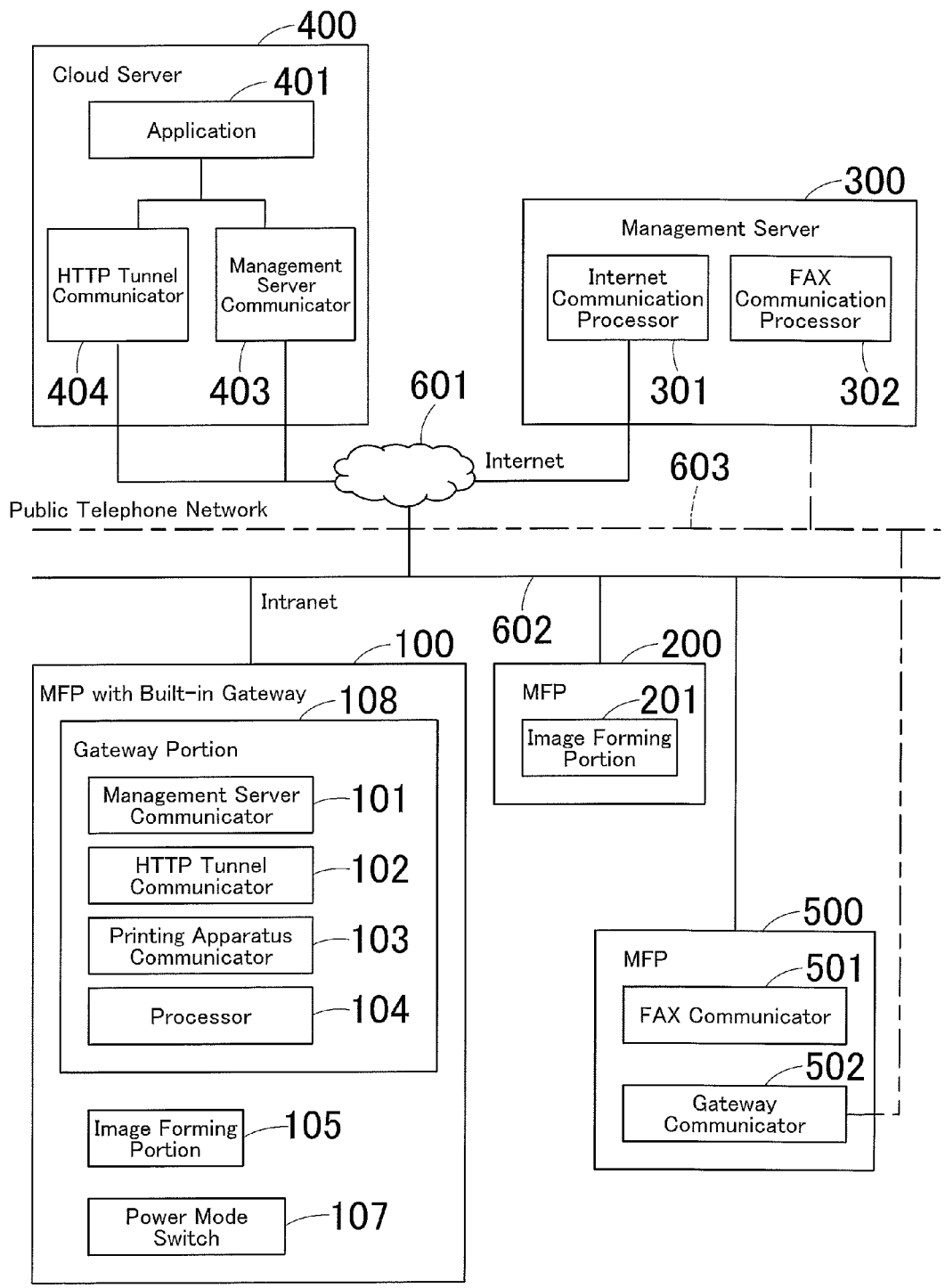
FIG. 6 is a view illustrating a comprehensive configuration of a communication system according to another embodiment of the present embodiment.

FIG. 6 is a view illustrating a comprehensive configuration of a communication system according to another embodiment of the present invention. In this embodiment, the MFP with built-in gateway 100 does not have a G3 type facsimile. While the MFP with built-in gateway 100 is in deep sleep mode, the management server 300 receives a request to access the cloud server 400 by HTTP tunneling. The management server 300 transfers the HTTP tunneling request to an alternative device that is connected to the same network 602 as the MFP with built-in gateway 100 is. The alternative device receives the HTTP tunneling request and transfers it to the MFP with built-in gateway 100 through the network.

The configuration of the communication system of FIG. 6 is only different from that of FIG. 1 for the following points. The FAX communicator 106 is missing from the MFP with built-in gateway 100. An alternative MFP 500, which is alternative to the MFP with built-in gateway 100, is additionally installed in the communication system. Since the communication system of FIG. 6 has the most parts of its configuration in common with that of FIG. 1, the descriptions of the common parts will be omitted.

The alternative MFP 500 is provided with a FAX communicator 501 and a gateway communicator 502. The FAX communicator 501, which supports the G3 standard, performs facsimile communication with the management server 300 and other external apparatuses. The gateway communicator 502 performs communication with the MFP with built-in gateway 100 through the network 602.

In this embodiment, the alternative MFP 500 receives facsimile data from the management server 300 and transfers it to the MFP with built-in gateway 100.

Figure 7:
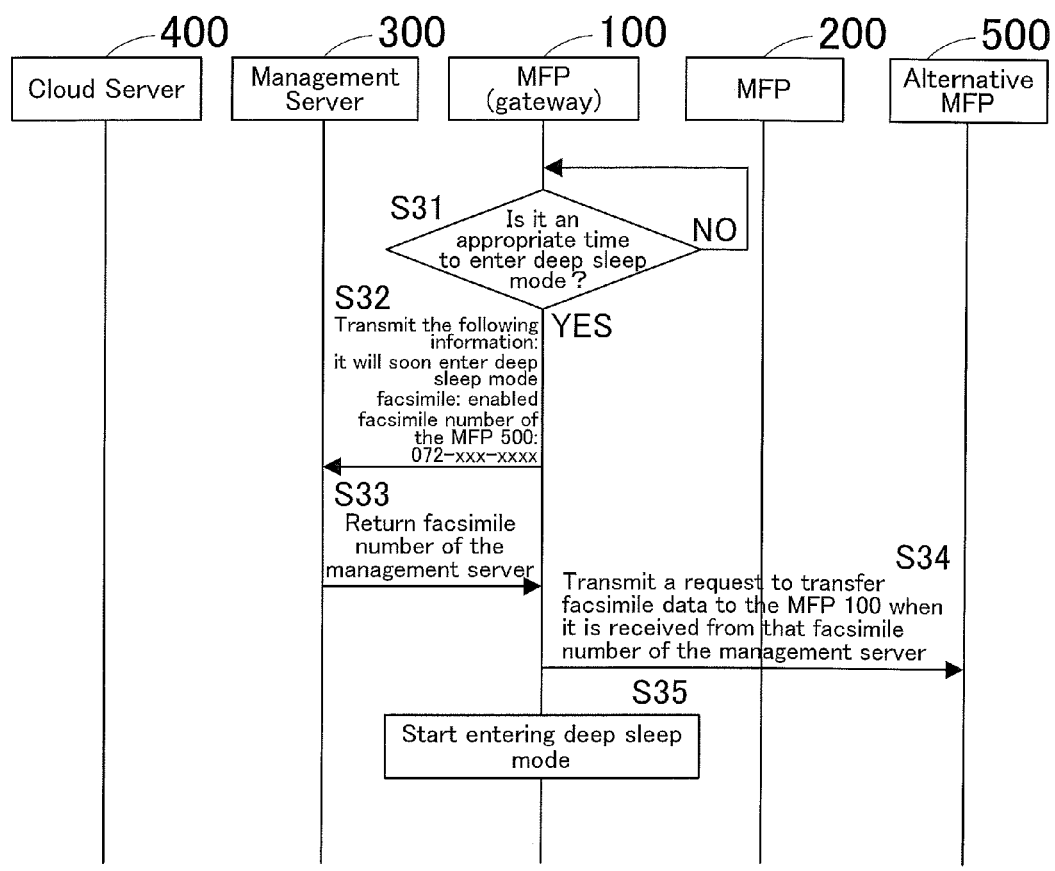
FIG. 7 is a sequence representing the control operations of the apparatuses to be performed when the gateway-enabled device enters deep sleep mode, in the embodiment described with reference to FIG. 6.

FIG. 7 is a sequence representing the control operations of the apparatuses to be performed when the gateway-enabled device enters deep sleep mode, in the embodiment described with reference to FIG. 6.

In Step S31, the MFP with built-in gateway 100 judges whether or not it is an appropriate time to enter deep sleep mode. If it is not an appropriate time to enter deep sleep mode (NO in Step S31), the sequence keeps staying at Step S31. If it is an appropriate time to enter deep sleep mode (YES in Step S31), the sequence proceeds to Step S32, in which the MFP with built-in gateway 100 transmits to the management server 300 identification information of the MFP 100 itself, a notice that it will soon enter deep sleep mode, a notice that it has a G3 type facsimile, and address information of a G3 type facsimile of the alternative MFP 500 (facsimile number). The MFP with built-in gateway 100 may transmit the information and notices to the management server 300 using a XMPP session or using another session such as a simple object access protocol (SOAP) session or an extensible markup language (XML) session.

In Step S33, in response to all the information and notices, the management server 300 returns address information of its own G3 facsimile (facsimile number) to the MFP with built-in gateway 100.

In Step S34, the MFP with built-in gateway 100 transfers the facsimile number of the management server 300 to the alternative MFP 500. In the same step, the MFP with built-in gateway 100 further transmits to the alternative MFP 500 a request to transfer facsimile data to the MFP with built-in gateway 100 when it is received from that facsimile number. After that, in Step S35, the MFP with built-in gateway 100 enters deep sleep mode by terminating the active session or cutting off the power to the main controller and relevant modules, for example.

Figure 8:
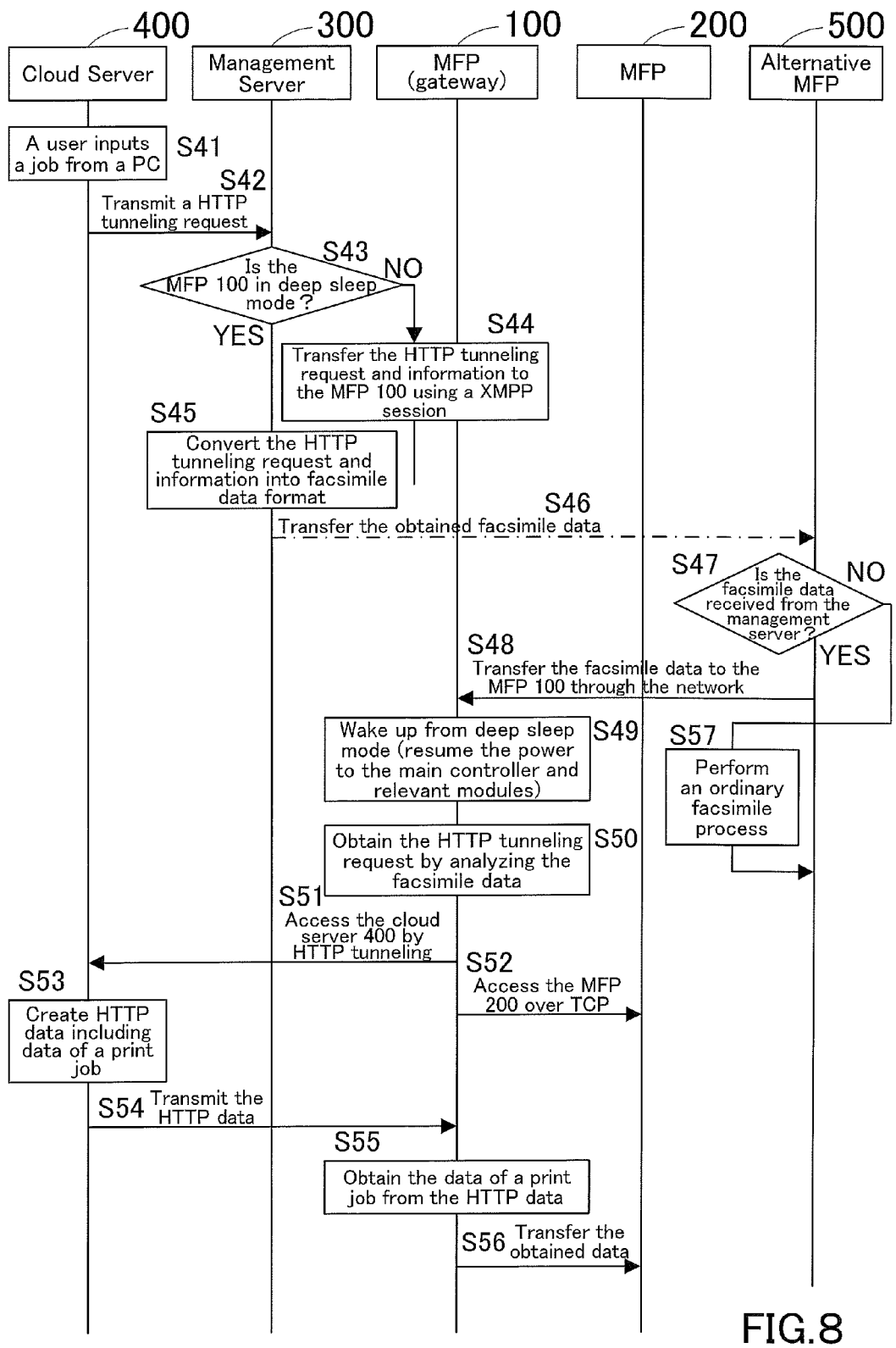
FIG. 8 is a sequence representing the control operations of the apparatuses to be performed when the cloud server accepts a print job while the gateway-enabled device is in deep sleep mode, in the embodiment described with reference to FIG. 6.

FIG. 8 is a sequence representing the control operations of the apparatuses to be performed when the cloud server 400 accepts a print job while the MFP with built-in gateway 100 is in deep sleep mode, in the embodiment described with reference to FIG. 6.

A user accesses the application 401 of the cloud server 400 by operating a personal computer (PC) or a portable terminal apparatus, for example. In Step S41, the user creates a print job for printing specified data by a specified printing apparatus and inputs it to the cloud server 400. The cloud server 400 generates a request to access the cloud server 400 by HTTP tunneling. In Step S42, the cloud server 400 transmits the request to the management server 300.

The management server 300 judges, in Step S43, whether or not the MFP with built-in gateway 100 is in deep sleep mode. This judgement is made depending on whether or not such a notice has been received from the MFP with built-in gateway 100.

If the MFP with built-in gateway 100 is not in deep sleep mode (NO in Step S43), the flowchart proceeds to Step S44, in which the management server 300 transfers the HTTP tunneling request and information to the MFP with built-in gateway 100 using a XMPP session, as in the conventional system. In Step S50, the MFP with built-in gateway 100 analyzes the HTTP tunneling request. The flowchart then proceeds forward (continues from Step S51 in order) as in the case where the MFP with built-in gateway 100 is in normal operation mode in the conventional system.

If the MFP with built-in gateway 100 is in deep sleep mode (YES in Step S43), the management server 300 confirms the presence of a notice that it has a G3 type facsimile and address information of the G3 type facsimile. In Step S45, the management server 300 converts the HTTP tunneling request and information into facsimile data format; in Step S46, the management server 300 transmits, by the G3 type facsimile, the obtained facsimile data to the address received from the MFP with built-in gateway 100. The HTTP tunneling request and information includes a URL to access over HTTP, identification information of the cloud server 400 to access, and identification information of a tunnel.

In Step S47, the alternative MFP 500 judges whether or not the facsimile data is received from the management server 300. If it is not received from the management server 300 (NO in Step S47), the alternative MFP 500 performs an ordinary facsimile process in Step S57. If it is received from the management server 300 (YES in Step S47), the alternative MFP 500 transfers the facsimile data to the MFP with built-in gateway 100 through the network 602 in Step S48.

With the inbound facsimile data, the MFP with built-in gateway 100 wakes up from deep sleep mode in Step S49. In other words, the MFP with built-in gateway 100 resumes the power to the main controller and relevant modules. In Step S50, the MFP with built-in gateway 100 obtains the HTTP tunneling request and information by analyzing the facsimile data. The MFP with built-in gateway 100 accesses the cloud server 400 by HTTP tunneling in Step S51, then accesses the MFP 200 over TCP in Step S52.

In Step S53, upon opening of a HTTP tunnel, the cloud server 400 creates HTTP data including a print job. In Step S54, the cloud server 400 transmits the HTTP data to the MFP with built-in gateway 100.

In Step S24, the MFP with built-in gateway 100 obtains data of a print job from the HTTP data received therefrom. In Step S25, the MFP with built-in gateway 100 transfers the data to the MFP 200. The MFP 200 executes the print job with the received data. If necessary, the MFP 200 may return a notice of printing completion to the cloud server 400 by way of the MFP with built-in gateway 100.

As described above, in this embodiment, the MFP with built-in gateway 100, which does not have a G3 type facsimile, receives facsimile data from the alternative MFP 500. With the inbound facsimile data, the MFP with built-in gateway 100 wakes up from power saving mode to normal operation mode to access the cloud server 400 by HTTP tunneling. Briefly, the MFP with built-in gateway 100 can wake up from power saving mode to access the cloud server 400 without adversely affecting the load on the management server 300.

Figure 9:
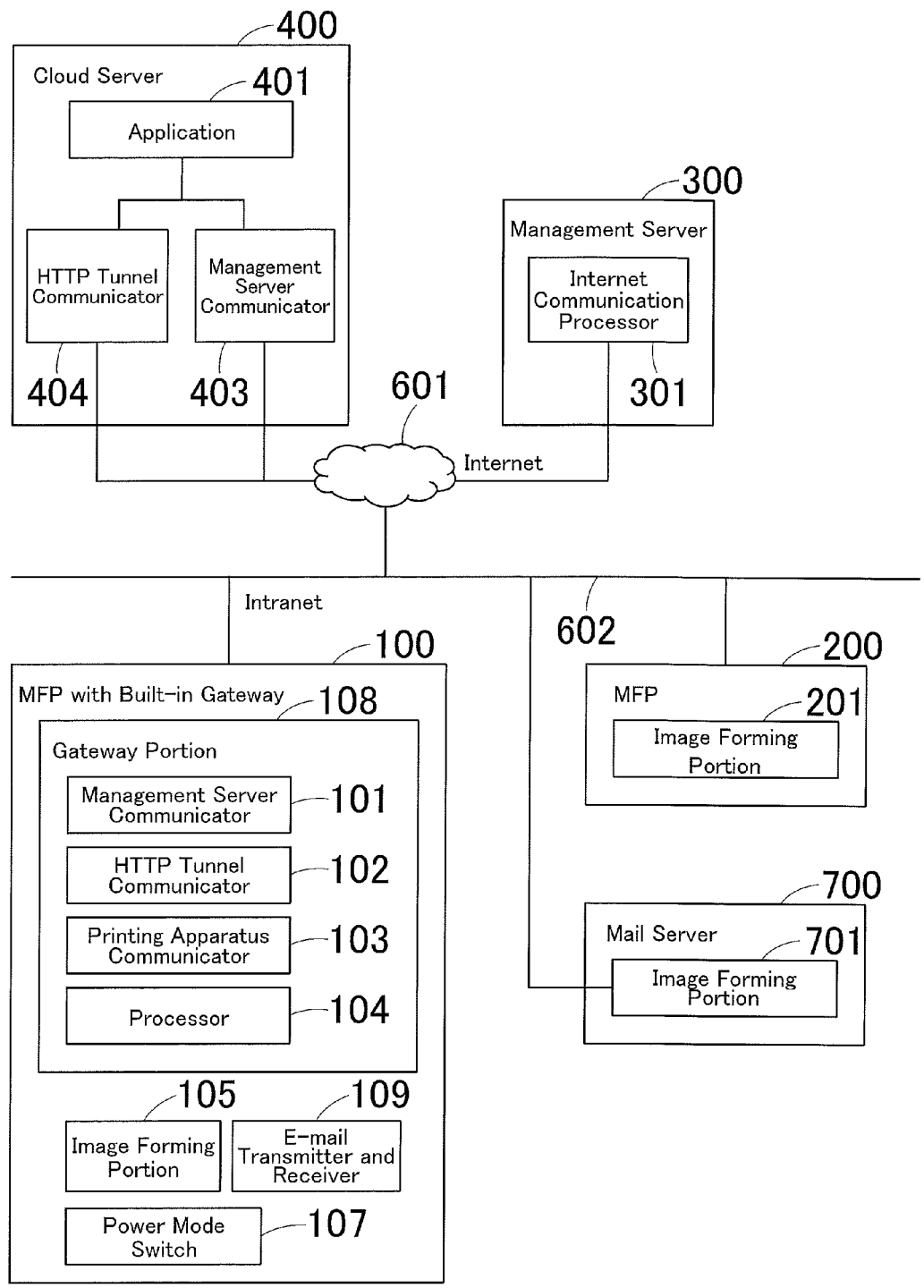
FIG. 9 is a view illustrating a comprehensive configuration of a communication system according to yet another embodiment of the present embodiment.

FIG. 9 is a view illustrating a comprehensive configuration of a communication system according to yet another embodiment of the present invention. In this embodiment, while the MFP with built-in gateway 100 is in deep sleep mode, the management server 300 receives a request to access the cloud server 400 by HTTP tunneling. The management server 300 transfers an e-mail including the HTTP tunneling request to the mail server 700. The mail server 700 then transfers the e-mail to the MFP with built-in gateway 100 over SMTP.

The configuration of the communication system of FIG. 9 is only different from that of FIG. 1 for the following points. An e-mail transmitter and receiver 109 is additionally provided in the MFP with built-in gateway 100; instead, the FAX communicator 106 may be missing from the MFP with built-in gateway 100. A mail server 700 is additionally installed in the communication system. Since the communication system of FIG. 9 has the most parts of its configuration in common with that of FIG. 1, the descriptions of the common parts will be omitted.

The mail server 700 is provided with a mail server portion 701. The mail server portion 701 receives e-mails from the management server 300 and other apparatuses. The mail server portion 701 then transfers them to a predetermined address of the MFP with built-in gateway 100 over simple mail transfer protocol (SMTP).

In the transition to deep sleep mode, the MFP with built-in gateway 100 transmits the following information and notices to the management server 300, using a XMPP or another session. They are identification information of the MFP 100 itself, a notice that it will soon enter deep sleep mode, a notice that mail function is enabled, and an e-mail address of the cloud server 400. After transmitting all of them, the MFP with built-in gateway 100 starts entering deep sleep mode.

Figure 10:
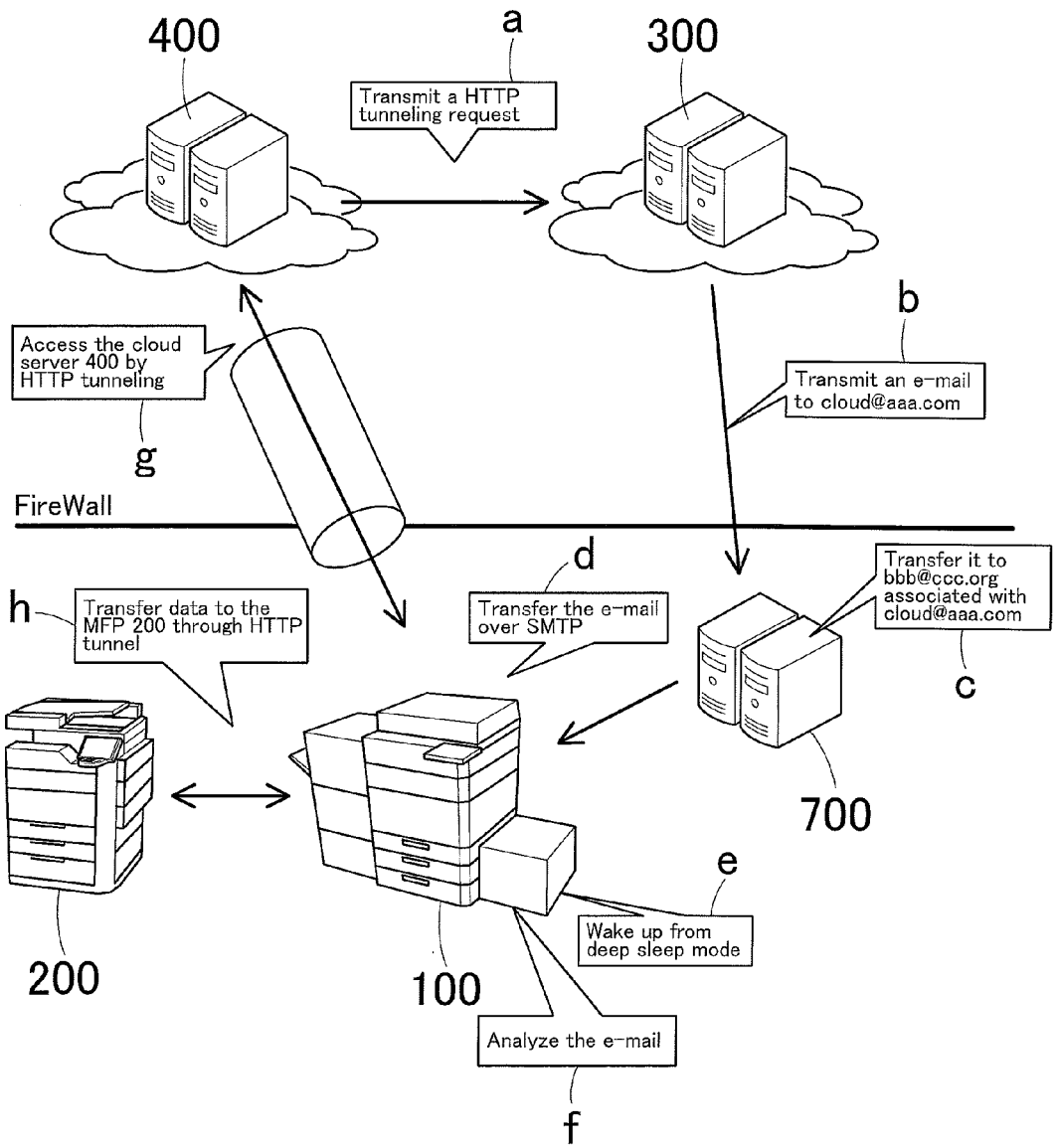
FIG. 10 is a view to explain the operations to be performed when the cloud server accepts a print job while the gateway-enabled device is in deep sleep mode, in the embodiment described with reference to FIG. 9.

FIG. 10 is a view to explain the operations to be performed when the cloud server 400 accepts a print job while the MFP with built-in gateway is in deep sleep mode.

Upon accepting a print job, the cloud server 400 transmits to the management server 300 a request for the MFP with built-in gateway 100 to access the cloud server 400 (see (a) in FIG. 10).

The management server 300 already received a notice from the MFP with built-in gateway 100 and so recognizes that the MFP with built-in gateway 100 is now in deep sleep mode. So, the management server 300 transmits an e-mail including a request to access the cloud server 400 by HTTP tunneling, to the e-mail address received from the MFP with built-in gateway 100 (see (b) in FIG. 10).

Meanwhile, the mail server 700 stores the e-mail address of the cloud server 400 (cloud@aaa.com, in this example) and the e-mail address of the MFP with built-in gateway 100 (bbb@ccc.org, in this example), being associated with each other. The domain name "ccc.org" in the e-mail address identifies the location address of the MFP with built-in gateway 100. The mail server 700 receives the e-mail from the management server 300. If this e-mail is addressed to the e-mail address of the cloud server 400, the mail server 700 transfers it to the e-mail address associated with the e-mail address of the cloud server 400 (see (c) in FIG. 10). The cloud server 400 transfers the e-mail to the MFP with built-in gateway 100 over SMTP (see (d) in FIG. 10).

With the inbound e-mail, the MFP with built-in gateway 100 wakes up from deep sleep mode (see (e) in FIG. 10). Upon being back in normal operation mode, the MFP with built-in gateway 100 judges whether or not the header of the e-mail includes an identifier representing a request to access the cloud server 400 by HTTP tunneling. If it includes such an identifier, the MFP with built-in gateway 100 obtains the HTTP tunneling request and information by analyzing the main body of the e-mail (see (f) in FIG. 10). The MFP with built-in gateway 100 accesses the cloud server 400 by HTTP tunneling (see (g) in FIG. 10). Through HTTP tunnel, the cloud server 400 transfers data of a print job to the MFP 200 by way of the MFP with built-in gateway 100 (see (e) in FIG. 3). The MFP 200 then executes the print job with the received data.

FIG. 11 shows a substantial part of the header of an e-mail transferred to the MFP with built-in gateway 100 from the mail server 700. In this example, the bold text "KM_ . . . Connect Request" in the last line of the header is an identifier representing a request to access the cloud server 400 by HTTP tunneling.

Figure 12:
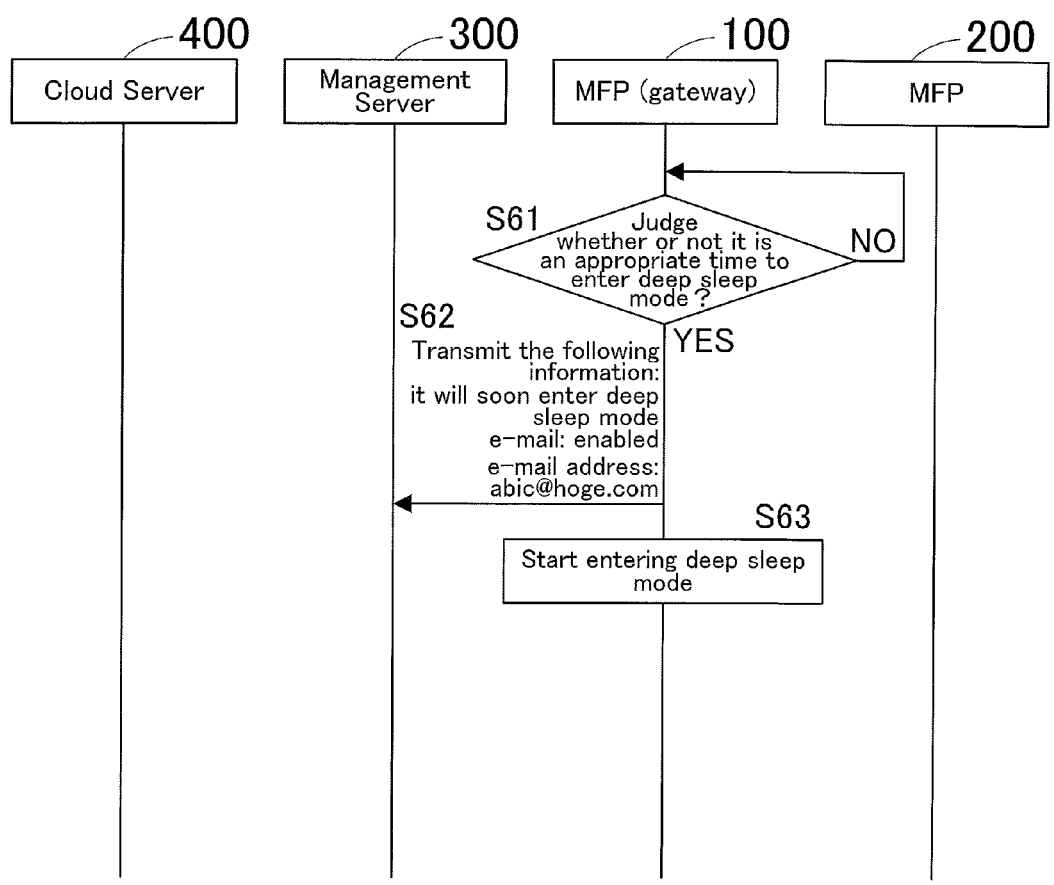
FIG. 12 is a sequence representing the control operations of the apparatuses to be performed when the gateway-enabled device enters deep sleep mode, in the embodiment described with reference to FIG. 10.

FIG. 12 is a sequence representing the control operations of the apparatuses to be performed when the MFP with built-in gateway 100 enters deep sleep mode, in the embodiment described with reference to FIG. 10.

In Step S61, the MFP with built-in gateway 100 judges whether or not it is an appropriate time to enter deep sleep mode. If it is not an appropriate time to enter deep sleep mode (NO in Step S61), the sequence keeps staying at Step S61. If it is an appropriate time to enter deep sleep mode (YES in Step S61), the sequence proceeds to Step S62, in which the MFP with built-in gateway 100 transmits the following information and notices to the management server 300. They are identification information of the MFP 100 itself, a notice that it will soon enter deep sleep mode, a notice that e-mail function is enabled, and e-mail address of the cloud server 400. The MFP with built-in gateway 100 may transmit the information and notices to the management server 300 using a XMPP session or using another session such as a simple object access protocol (SOAP) session or an extensible markup language (XML) session.

After that, in Step S63, the MFP with built-in gateway 100 enters deep sleep mode by terminating the active session or cutting off the power to the main controller and relevant modules, for example.

Figure 13:
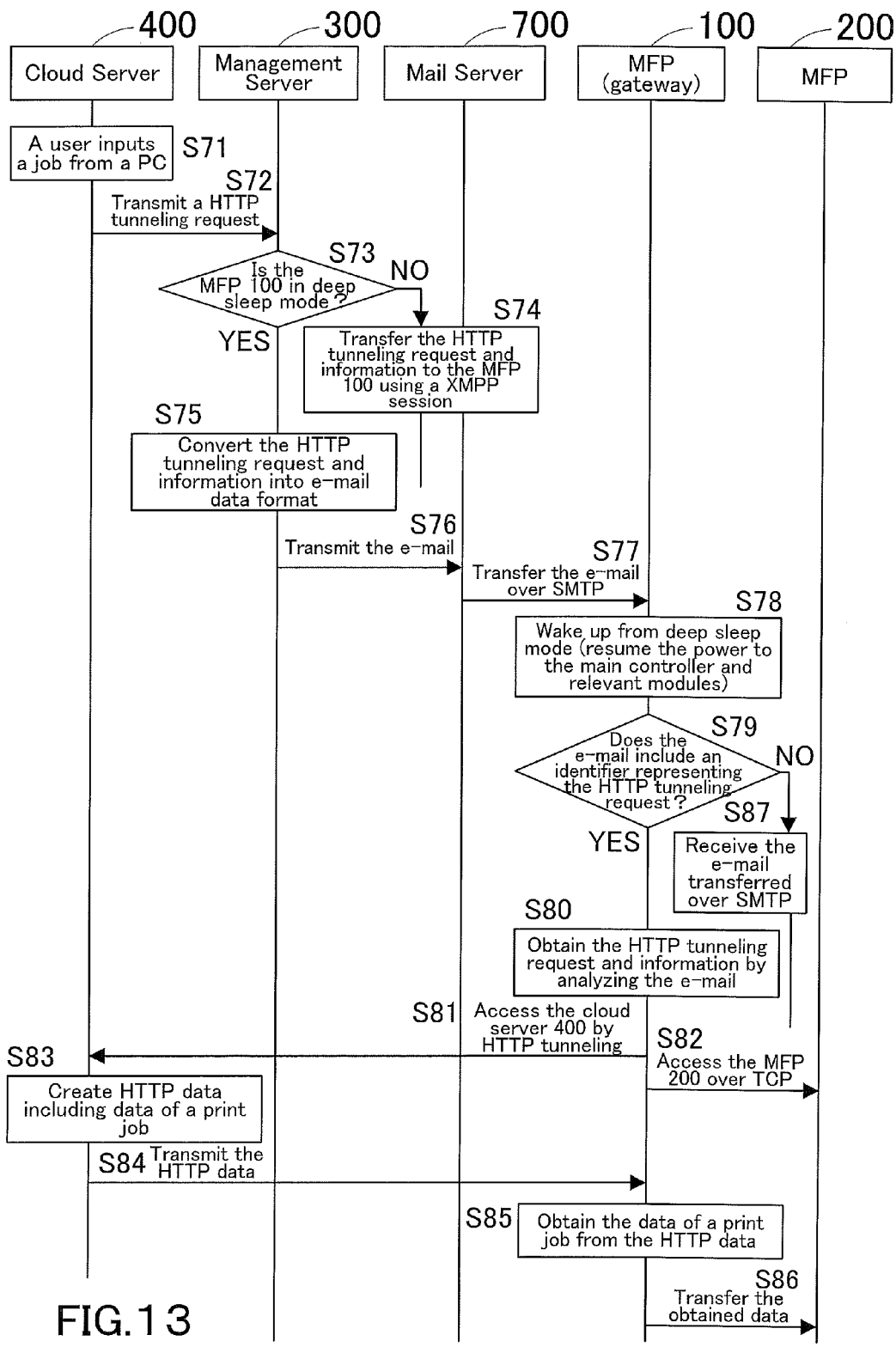
FIG. 13 is a sequence representing the control operations of the apparatuses to be performed, in the embodiment described with reference to FIG. 10, when the cloud server accepts a print job while the gateway-enabled device is in deep sleep mode, in the embodiment described with reference to FIG. 10.
Figure 14:
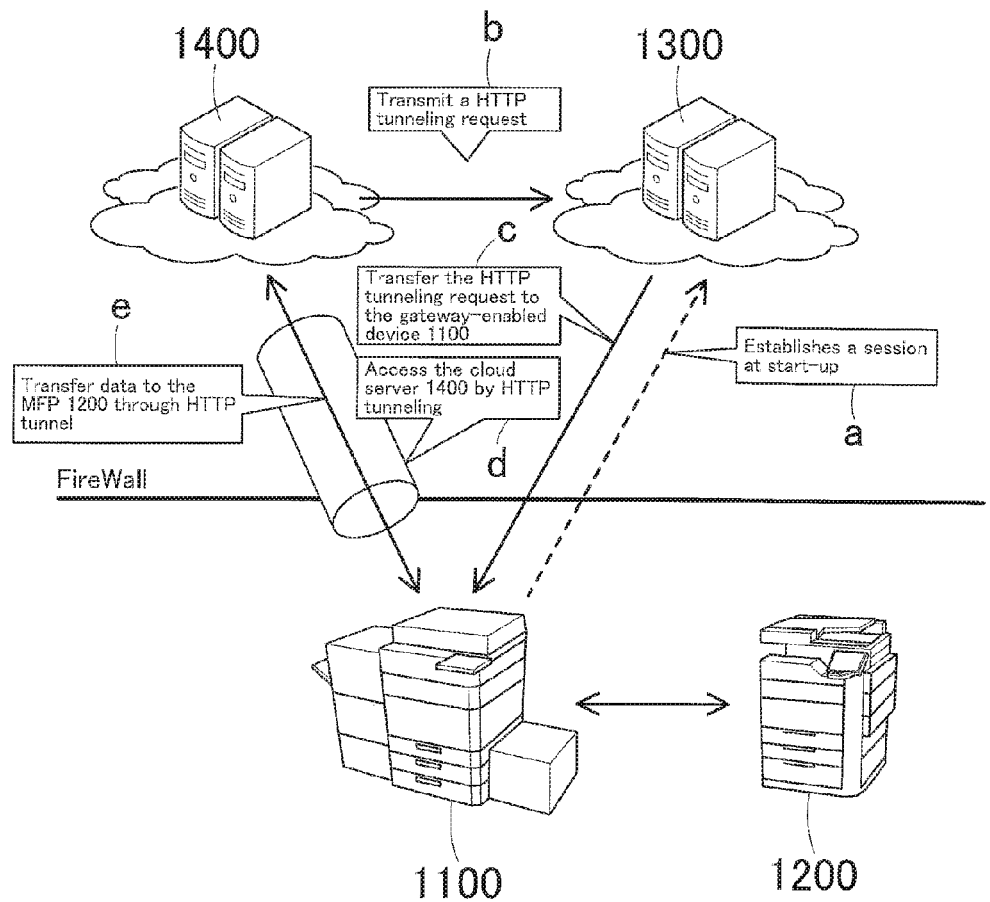
FIG. 14 is a view illustrating a comprehensive configuration of a conventional communication system.
Figure 15:
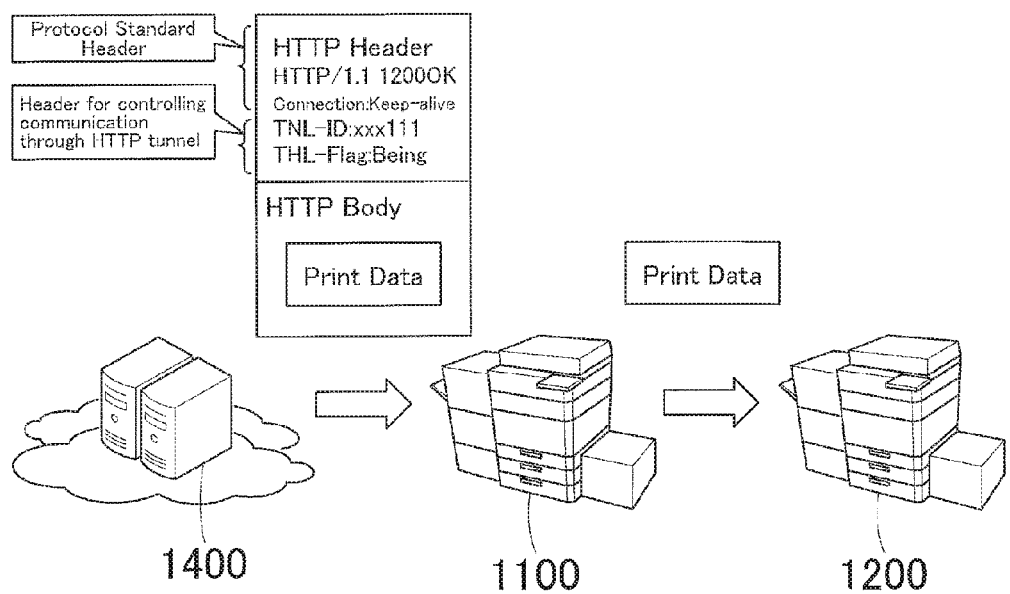
FIG. 15 is a view to explain the mechanisms of tunnel communication over HTTP.

FIG. 13 is a sequence representing the control operations of the apparatuses to be performed when the cloud server 400 accepts a print job while the MFP with built-in gateway 100 is in deep sleep mode, in the embodiment described with reference to FIG. 10.

A user accesses the application 401 of the cloud server 400 by operating a personal computer (PC) or a portable terminal apparatus, for example. In Step S71, the user creates a print job for printing specified data by a specified printing apparatus and inputs it to the cloud server 400. The cloud server 400 then generates a request to access the cloud server 400 by HTTP tunneling. In Step S72, the cloud server 400 transmits the request to the management server 300.

The management server 300 judges, in Step S73, whether or not the MFP with built-in gateway 100 is in deep sleep mode. This judgement is made depending on whether or not such a notice has been received from the MFP with built-in gateway 100.

If the MFP with built-in gateway 100 is not in deep sleep mode (NO in Step S73), the flowchart proceeds to Step S74, in which the management server 300 transfers the HTTP tunneling request and information to the MFP with built-in gateway 100 using a XMPP session, as in the conventional system. In Step S80, the MFP with built-in gateway 100 analyzes the HTTP tunneling request. The flowchart then proceeds forward (continues from Step S81 in order) as in the case where the MFP with built-in gateway 100 is in normal operation mode in the conventional system.

If the MFP with built-in gateway 100 is in deep sleep mode (YES in Step S73), the management server 300 confirms the presence of a notice that mail function is enabled and an e-mail address of the cloud server 400. In Step S75, the management server 300 creates an e-mail including the HTTP tunneling request and information; in Step S76, the management server 300 transmits the e-mail to the e-mail address of the cloud server 400. The HTTP tunneling request and information includes a URL to access over HTTP, identification information of the cloud server 400 to access, and identification information of a tunnel.

The mail server 700 receives the e-mail, and in Step S77, transfers it to the e-mail address associated with the e-mail address of the cloud server 400 over SMTP.

The MFP with built-in gateway 100 receives the e-mail over SMTP. With the inbound e-mail, the MFP with built-in gateway 100 wakes up from the deep sleep mode in Step S78. In other words, the MFP with built-in gateway 100 resumes the power to the main controller and relevant modules. In Step S79, the MFP with built-in gateway 100 judges whether or not the e-mail includes an identifier representing a HTTP tunneling request. If it includes no such identifier (NO in Step S79), the MFP with built-in gateway 100 performs an ordinary SMTP receiving process in Step S87.

If it includes such an identifier (YES in Step S79), the MFP with built-in gateway 100 obtains the HTTP tunneling request and information by analyzing the e-mail, in Step S80. The MFP with built-in gateway 100 accesses the cloud server 400 by HTTP tunneling in Step S81, then accesses the MFP 200 over TCP in Step S82.

In Step S83, upon opening of a HTTP tunnel, the cloud server 400 creates HTTP data including a print job. In Step S84, the cloud server 400 transmits the HTTP data to the MFP with built-in gateway 100.

In Step S85, the MFP with built-in gateway 100 obtains data of a print job from the HTTP data received therefrom. In Step S86, the MFP with built-in gateway 100 transfers the data to the MFP 200. The MFP 200 executes the print job with the received data. If necessary, the MFP 200 may return a notice of printing completion to the cloud server 400 by way of the MFP with built-in gateway 100.

As described above, in this embodiment, the management server 300 inserts to the header of an e-mail an identifier representing a request to access the cloud server 400 by HTTP tunneling and transmits the e-mail to the MFP with built-in gateway 100. By detecting the identifier from the e-mail header, the MFP with built-in gateway 100 recognizes that the e-mail is intended as a HTTP tunneling request. This allows the MFP with built-in gateway 100 to recognize, without any trouble or difficulty, a request to access the cloud server 400 by HTTP tunneling. Briefly, the MFP with built-in gateway 100 can wake up from power saving mode to access the cloud server 400 without adversely affecting the load on the management server 300.

In the embodiment described with reference to FIGS. 9 to 13, the management server 300 inserts to the header of an e-mail an identifier representing a request to access the cloud server 400 by HTTP tunneling, and by detecting the identifier from the e-mail header, the MFP with built-in gateway 100 recognizes that the e-mail is intended as a HTTP tunneling request. This embodiment should not be limited to this method and may employ another method as described below. In response to the information and notices (Step S62 of FIG. 12), the management server 300 returns its own e-mail address to the MFP with built-in gateway 100. The MFP with built-in gateway 100 then judges whether or not the sender address of a received e-mail is identical with the e-mail address received from the management server 300 and, if it is identical, recognizes that the e-mail is intended as a request to access the cloud server 400 by HTTP tunneling. In this method, the management server 300 does not need to insert an identifier representing the HTTP tunneling request to the header of the e-mail.

While some embodiments of the present invention have been described in detail herein and shown in the accompanying drawings, it should be understood that the present invention is not limited to the foregoing embodiments.

For example, in these embodiments, the cloud server 400 and the management server 300 are provided separately. Alternatively, these may be provided in a unified manner, i.e., as one apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A communication system comprising a cloud server, a management server, a gateway-enabled device, and a printing apparatus, the cloud server, the management server, and the gateway-enabled device being connected to each other through the Internet, the printing apparatus being connected to the gateway-enabled device through a communication network, the cloud server configured to:
accept a print job input from an external apparatus, the print job including a notice of the printing apparatus;
transmit a hyper-text transfer protocol (HTTP) tunneling request to the management server, the HTTP tunneling request to access the cloud server by HTTP tunneling, the HTTP tunneling request being addressed to the gateway-enabled device; and
transmit the accepted print job to the gateway-enabled device, the gateway-enabled device having accessed the cloud server by HTTP tunneling in accordance with the HTTP tunneling request received by way of the management server, the management server configured to:
transfer the HTTP tunneling request to the gateway-enabled device based on the HTTP tunneling request received from the cloud server; and
transfer the HTTP tunneling request to the gateway-enabled device by a method allowing the gateway-enabled device to wake up from power saving mode to normal operation mode, if the HTTP tunneling request is received from the cloud server while the gateway-enabled device is in power saving mode, the gateway-enabled device configured to:
switch the gateway-enabled device from normal operation mode to power saving mode and wake up the gateway-enabled device from power saving mode to normal operation mode based on the HTTP tunneling request received from the management server;
access the cloud server by HTTP tunneling if the HTTP tunneling request is received from the management server while the gateway-enabled device is in normal operation mode, or that accesses the cloud server by HTTP tunneling after the gateway-enabled device is returned to normal operation mode, if the HTTP tunneling request is received from the management server while the gateway-enabled device is in power saving mode;
receive the print job from the cloud server having been accessed by the management server by HTTP tunneling; and
transfer the print job to the printing apparatus specified in the print job;
wherein the printing apparatus executes the print job received from the gateway-enabled device.

2. The communication system according to claim 1, wherein the method allowing the gateway-enabled device to wake up from power saving mode to normal operation mode is facsimile communication based on the G3 standard, and the gateway-enabled device has facsimile function based on the G3 standard.

3. The communication apparatus according to claim 2, wherein:
in the transition to power saving mode, the gateway-enabled device transmits to the management server a notice that it will soon enter power saving mode, a notice that facsimile function is enabled, and address information of its own facsimile, and when the gateway-enabled device enters power saving mode, the management server transmits address information of its own facsimile to the gateway-enabled device; and
if the sender address of an inbound facsimile is identical with the address information received from the management server, the gateway-enabled device recognizes that the facsimile is intended as a HTTP tunneling request to access the cloud server by HTTP tunneling.

4. The communication system according to claim 2, wherein:
in the transition to power saving mode, the gateway-enabled device transmits to the management server a notice that it will soon enter power saving mode and address information of a facsimile of an alternative device, the alternative device having facsimile function and being connected to the same communication network as the gateway-enabled device, and also transmits to the alternative device a request to transfer facsimile data to the gateway-enabled device through the network, the facsimile data received from the management server;
the management server transfers the facsimile data to the alternative device and the alternative device transfers it to the gateway-enabled device through the network; and
with the facsimile data received from the alternative device, the gateway-enabled device wakes up from power saving mode to normal operation mode to access the cloud server by HTTP tunneling.

5. The communication system according to claim 1, wherein the method allowing the gateway-enabled device to wake up from power saving mode to normal operation mode is e-mail transmission over simple mail transfer protocol (SMTP).

6. The communication system according to claim 5, wherein:
the management server inserts an identifier to the header of an e-mail addressed to the gateway-enabled device, the identifier representing the HTTP tunneling request; and
if the header of an inbound e-mail includes the identifier, the gateway-enabled device recognizes that the e-mail is intended as the HTTP tunneling request.

7. The communication system according to claim 5, wherein:
in the transition to power saving mode, the gateway-enabled device transmits to the management server a notice that it will soon enter power saving mode, a notice that mail function is enabled, and e-mail address information of the gateway-enabled device itself, and when the gateway-enabled device enters power saving mode, the management server transmits e-mail address information of the management server itself to the gateway-enabled device; and
if the sender address of an inbound e-mail is identical with the address information recieved from the management server, the gateway-enabled device recognizes that the e-mail is intended as the HTTP tunneling request.

8. The gateway-enabled device to be employed in the communication system according to claim 1.

9. A non-transitory computer-readable recording medium storing a communication program for use with a computer of the gateway-enabled device to be employed in the communication system according to claim 1, the communication program for the computer to execute:
  switching the gateway-enabled device from normal operation mode to power saving mode, and waking up the gateway-enabled device from power saving mode to normal operation mode based on the HTTP tunneling request received from the management server;
  accessing the cloud server by HTTP tunneling if the HTTP tunneling request is received from the management server while the gateway-enabled device is in normal operation mode, or accessing the cloud server by HTTP tunneling after the gateway-enabled device is returned to normal operation mode, if the HTTP tunneling request is received from the management server while the gateway-enabled device is in power saving mode;
  receiving the print job from the cloud server having been accessed by HTTP tunneling; and transferring the print job to the printing apparatus specified in the print job, the print job being received from the cloud server.

10. A communication method for a communication system, the communication system comprising a cloud server, a management server, a gateway-enabled device, and a printing apparatus, the cloud server, the management server, and the gateway-enabled device being connected to each other through the Internet, the printing apparatus being connected to the gateway-enabled device through a communication network, the communication method comprising:
  the following steps of the cloud server:
    accepting a print job input from an external apparatus, the print job including a notice of the printing apparatus, the external apparatus logged on the cloud server;
    transmitting a hyper-text transfer protocol (HTTP) tunneling request to the management server, the HTTP tunneling request to access the cloud server by HTTP tunneling, the HTTP tunneling request being addressed to the gateway-enabled device; and
    transmitting the print job to the gateway-enabled device, the print job being accepted by the print job accepting portion, the gateway-enabled device having accessed the cloud server by HTTP tunneling in accordance with the HTTP tunneling request, the HTTP tunneling request being received from the cloud server by way of the management server, the following steps of the management server:
  allowing a first access requesting portion to transfer the HTTP tunneling request to the gateway-enabled device based on the HTTP tunneling request received from the cloud server; and
  allowing the first access requesting portion to transfer the HTTP tunneling request to the gateway-enabled device by a method allowing the gateway-enabled device to wake up from power saving mode to normal operation mode, if the HTTP tunneling request is received from the cloud server while the gateway-enabled device is in power saving mode, and
the following steps of the gateway-enabled device:
  switching the gateway-enabled device from normal operation mode to power saving mode, and waking up the gateway-enabled device from power saving mode to normal operation mode based on the HTTP tunneling request received from the second access requesting portion of the management server;
  accessing the cloud server by HTTP tunneling if the HTTP tunneling request is received from the first access requesting portion of the management server while the gateway-enabled device is in normal operation mode, or accessing the cloud server by HTTP tunneling after the mode switch returns the gateway-enabled device to normal operation mode, if the HTTP tunneling request is received from the second access requesting portion of the management server while the gateway-enabled device is in power saving mode;
  receiving the print job from the cloud server having been accessed by HTTP tunneling; and
  transferring the print job to the printing apparatus specified in the print job, the print job being received from the cloud server,
wherein the printing apparatus is provided with a job executor whose step is executing the print job, the print job being received from the gateway-enabled device.

* * * * *